(12) United States Patent
Winnemoeller et al.

(10) Patent No.: US 9,305,382 B2
(45) Date of Patent: Apr. 5, 2016

(54) GEOMETRICALLY AND PARAMETRICALLY MODIFYING USER INPUT TO ASSIST DRAWING

(71) Applicant: Adobe Systems Incorporated, San Jose, CA (US)

(72) Inventors: Holger Winnemoeller, Seattle, WA (US); Jun Xie, Seattle, WA (US); Wilmot Wei-Mau Li, San Francisco, CA (US); Aaron Phillip Hertzmann, San Francisco, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 25 days.

(21) Appl. No.: 14/171,760

(22) Filed: Feb. 3, 2014

(65) Prior Publication Data

US 2015/0221106 A1   Aug. 6, 2015

(51) Int. Cl.
*G06T 11/20* (2006.01)
*G06F 3/01* (2006.01)

(52) U.S. Cl.
CPC ............... *G06T 11/203* (2013.01); *G06F 3/01* (2013.01); *G06T 2207/20012* (2013.01); *G06T 2207/20024* (2013.01)

(58) Field of Classification Search
CPC .................................................. G06T 11/203
See application file for complete search history.

(56) References Cited

U.S. PATENT DOCUMENTS

| 9,035,953 B1* | 5/2015 | Kukulski et al. ............... 345/443 |
| 2006/0045343 A1* | 3/2006 | Tremblay et al. ............. 382/186 |
| 2006/0227140 A1* | 10/2006 | Ramani et al. ............... 345/441 |
| 2012/0295231 A1 | 11/2012 | Zitnick, III et al. |
| 2015/0221070 A1 | 8/2015 | Winnemoeller et al. |

FOREIGN PATENT DOCUMENTS

WO   WO2010/089665   8/2010

OTHER PUBLICATIONS

Jun Xie, Aaron Hertzmann, Wilmot Li, and Holger Winnemöller, PortraitSketch: Face Sketching Assistance for Novices, Oct. 2014, UIST 14, Proceedings of the 27th annual ACM symposium on User interface software and technology, pp. 407-417.*

Jason M. Saragih et al., Deformable Model Fitting by Regularized Landmark Mean-Shift, 91 Int'l J. Computer Vision 200-215 (Sep. 2010).

Itamar Berger et al., Style and Abstraction in Portrait Sketching, ACM Transactions on Graphics (TOG) vol. 32, Issue 4 (Jul. 2013) Proceedings of ACM SIGGRAPH 2013.

Alex Limpaecher et al., Real-time Drawing Assistance through Crowdsourcing, ACM Transactions on Graphics (TOG) vol. 32, Issue 4 (Jul. 2013) Proceedings of ACM SIGGRAPH 2013.

(Continued)

*Primary Examiner* — Jeffery A Brier
(74) *Attorney, Agent, or Firm* — Keller Jolley Preece

(57) ABSTRACT

Methods for providing drawing assistance to a user sketching an image include geometrically correcting and parametrically adjusting user strokes to improve their placement and appearance. As a user draws a stroke, the stroke is geometrically corrected by moving the stroke toward a feature of the image the user is intending to draw. To further improve the user strokes, parametric adjustments are made to the geometrically-corrected stroke to emphasize "correctly" drawn lines and de-emphasize "incorrectly" drawn lines.

20 Claims, 11 Drawing Sheets

(56) References Cited

OTHER PUBLICATIONS

C. Lawrence Zitnick, Handwriting Beautification Using Token Means, ACM Transactions on Graphics (TOG) vol. 32, Issue 4 (Jul. 2013) Proceedings of ACM SIGGRAPH 2013.

Holger Winnemöller et al., XDoG: An eXtended Difference-of-Gaussians Compendium including Advanced Image, 36(6) Stylization Computers & Graphics 740-753 (Oct. 2012).

Daniel Dixon et al., iCanDraw?—Using Sketch Recognition and Corrective Feedback to Assist a User in Drawing Human Faces, CHI '10 Proceedings of the SIGCHI Conference on Human Factors in Computing Systems (Apr. 2010).

Arvo, J., and Novins, K. Fluid Sketches: Continuous Recognition and Morphing of Simple Hand-drawn Shapes. In Proc. UIST (2000), 73-80.

Barla, P., Thollot, J., and Sillion, F. Geometric Clustering for Line Drawing Simplification. In Proc. EGSR (2005).

Cole, F., Golovinskiy, A., Limpaecher, A., Barros, H. S., Finkelstein, A., Funkhouser, T., and Rusinkiewicz, S. Where Do People Draw Lines? ACM Trans. Graph. 27, 3 (Aug. 2008).

Comaniciu, D., and Meer, P. Mean Shift: A Robust Approach Toward Feature Space Analysis. IEEE Trans. PAMI 24, 5 (May 2002), 603-619.

Cummmings, D., Vides, F., and Hammond, T. I Don't Believe My Eyes!: Geometric Sketch Recognition for a Computer Art Tutorial. In Proc. SBIM (2012).

Eitz, M., Hays, J., and Alexa, M. How Do Humans Sketch Objects? ACM Trans. Graph. 31, 4 (Jul. 2012).

Fernquist, J., Grossman, T., and Fitzmaurice, G. Sketch-sketch Revolution: An Engaging Tutorial System for Guided Sketching and Application Learning. In Proc. UIST (2011).

Flagg, M., and Rehg, J. M. Projector-guided painting. In Proc. UIST (2006).

Iarussi, E., Bousseau, A., and Tsandilas, T. The Drawing Assistant: Automated Drawing Guidance and Feedback from Photographs. In Proc. UIST (2013).

Kazi, R. H., Igarashi, T., Zhao, S., and Davis, R. Vignette: Interactive texture design and manipulation with freeform gestures for pen-and-ink illustration. In Proc. CHI (2012).

Lee, Y. J., Zitnick, C. L., and Cohen, M. F. ShadowDraw: Real-time User Guidance for Freehand Drawing. ACM Trans. Graph. 30, 4 (Jul. 2011).

Lewis, J. R. Pairs of latin squares to counterbalance sequential effects and pairing of conditions and stimuli. In Proc. Human Factors and Ergonomics (1989).

Pusch, R., Samavati, F., Nasri, A., and Wyvill, B. Improving the sketch-based interface. The Visual Computer 23, 9-11 (2007), 955-962.

Salisbury, M. P., Anderson, S. E., Barzel, R., and Salesin, D. H. Interactive pen-and-ink illustration. In Proc. SIGGRAPH (1994).

Turk, G., and Banks, D. Image-guided Streamline Placement. In Proc. SIGGRAPH (1996), 453-460.

Zhao, M., and Zhu, S.-C. Artistic Rendering of Portraits. In Image and Video-Based Artistic Stylisation, P. Rosin and J. Collomosse, Eds. Springer, London, 2013.

\* cited by examiner

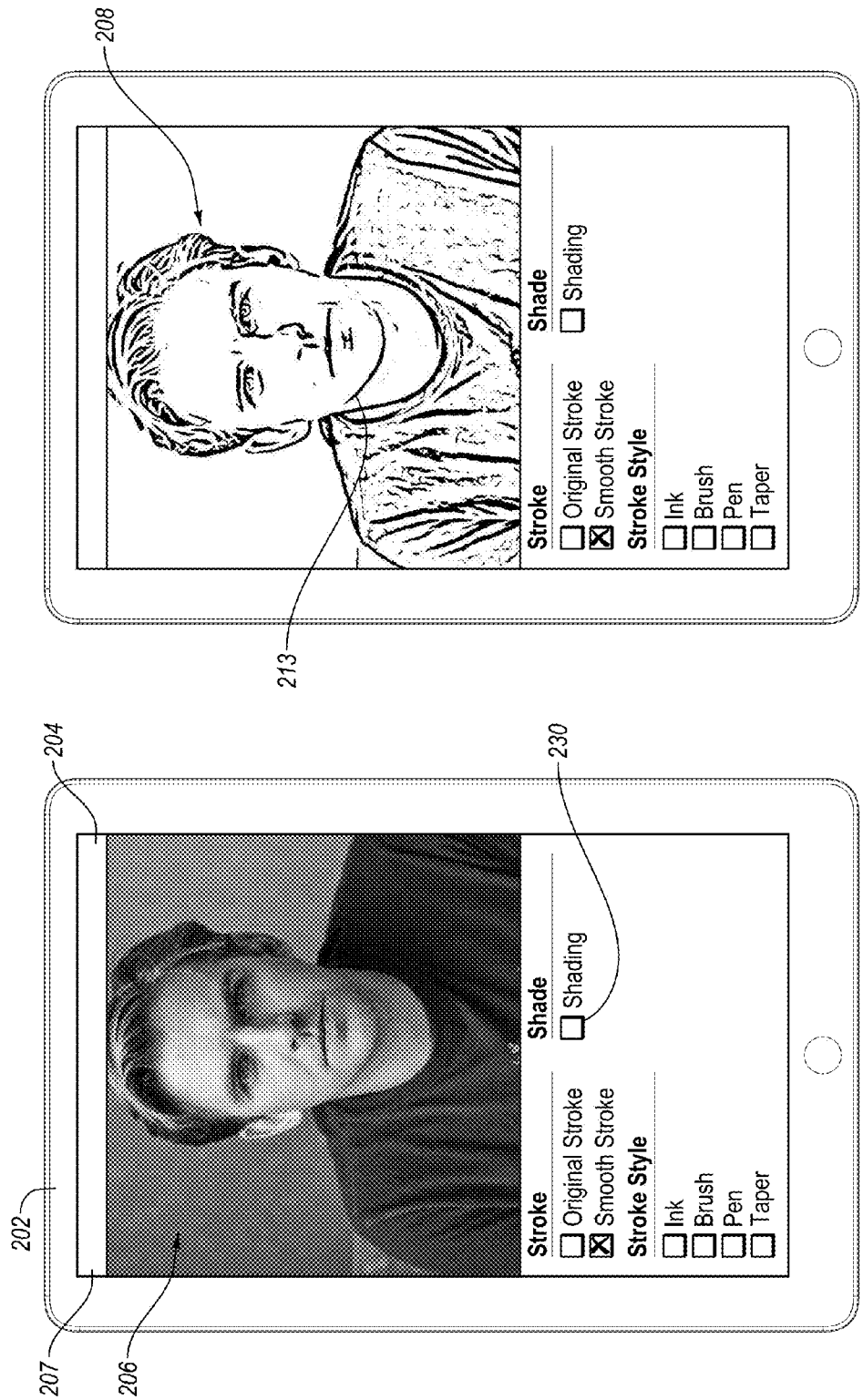

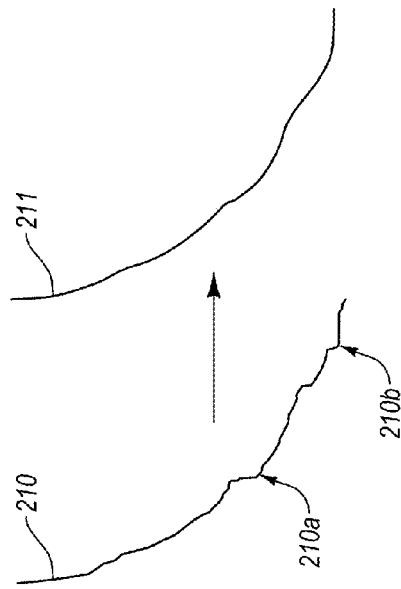
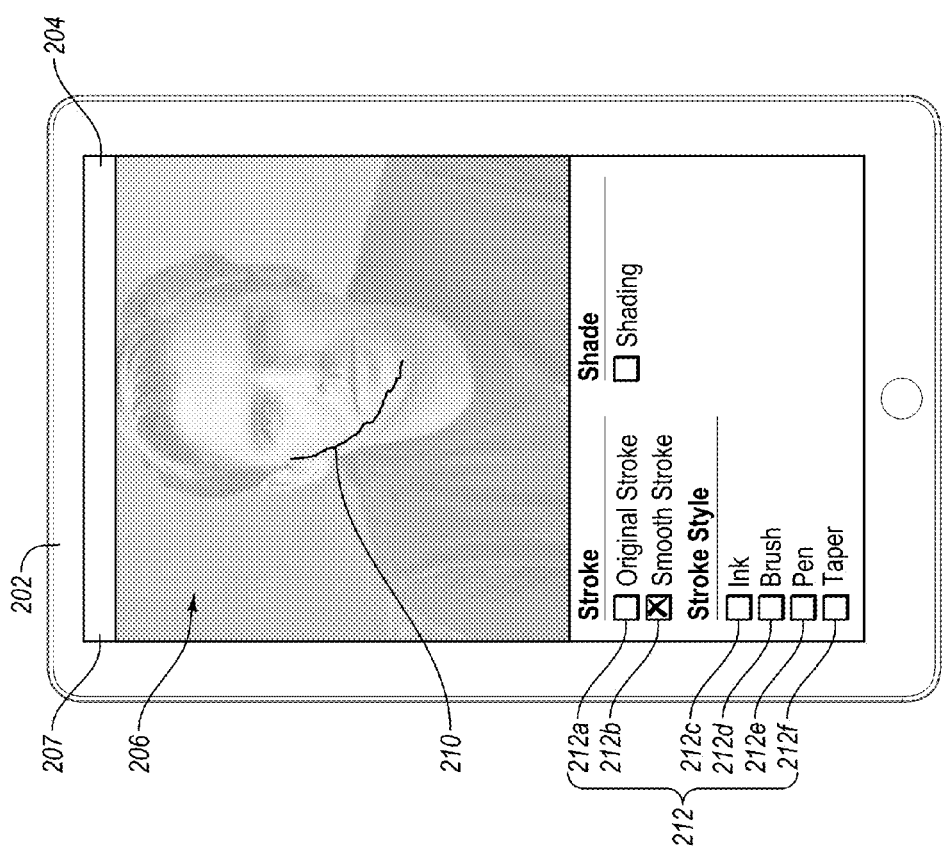
Fig. 2D
Fig. 2C

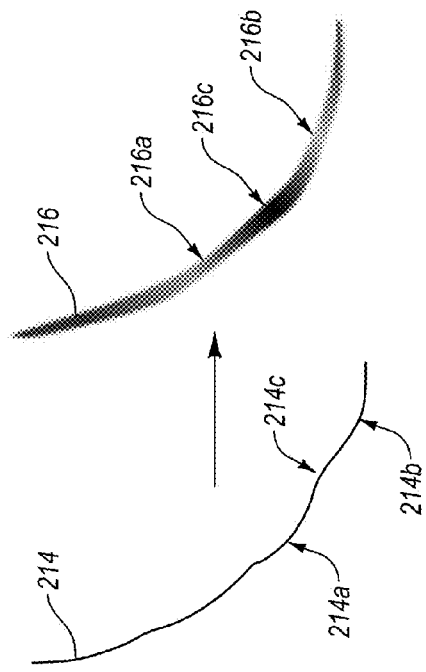
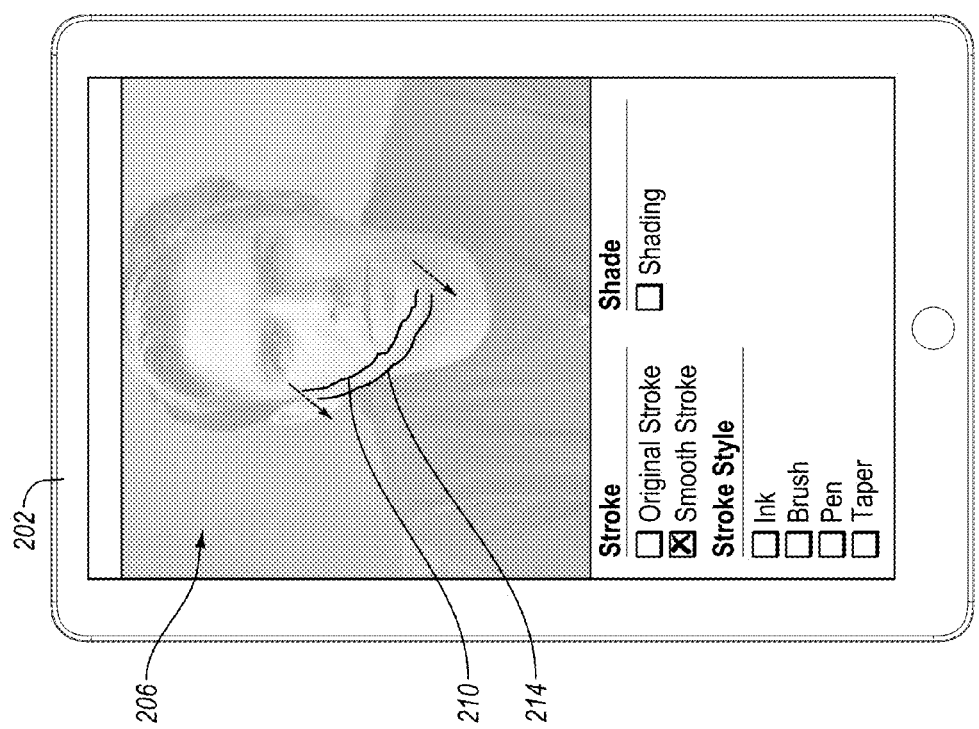
Fig. 2F
Fig. 2E

GEOMETRICALLY AND PARAMETRICALLY MODIFYING USER INPUT TO ASSIST DRAWING

CROSS REFERENCE TO RELATED APPLICATIONS

N/A.

BACKGROUND OF THE INVENTION

1. The Field of the Invention

One or more embodiments of the present invention relate generally to providing a user with drawing assistance. More specifically, one or more embodiments of the present invention relate to systems and methods of geometrically correcting and parametrically adjusting user strokes to assist in drawing.

2. Background and Relevant Art

Drawing is an important form of communication and expression. Unfortunately, drawing novices are sometimes hesitant to draw because they feel they lack the creative and technical skills to produce works of satisfactory visual quality. Novices commonly state that they are not creative or that they do not know how to draw. Drawing novices often share common challenges that cause them to lack confidence and produce works of lesser quality.

One challenge drawing novices face is how to draw aesthetic looking lines. Novices are often uncertain about the placement, shape, and curvature of lines. This uncertainty can cause a novice to draw slowly with many corrections along a single stroke. Such strokes typically appear jagged and otherwise lack the dynamic appearance of a stroke of a skilled artist preformed with controlled speed and curvature.

Drawing and sketching using computers, tablets, and mobile devices has become increasing popular. Such devices provide many advantages, including accessibility and ease of use. Unfortunately, computing devices can exacerbate the challenges that drawing novices face when drawing. For example, the use of low-fidelity input devices, such as a touch-screen or trackpad, can lead to misplaced, offset, or jittery lines. Indeed, the "fat finger" problem can make it difficult for even more experienced artists to draw in the "correct" location.

Another challenge for drawing novices is they commonly draw what they "know" rather than what they "see." For example, when sketching faces drawing novices tend to draw both the eyes and the mouth as closed almond-shapes. This is in contrast to trained artists that tend to place emphasis on some lines while omitting others to convey structural details and lighting effects. The inability of drawing novices to see and convey contours and lighting effects often leads to simplified representations of objects.

Conventional drawings assistance programs traditionally provide a tutorial approach. While tutorials can help a user produce improved drawings, they often reduce or minimize a user's style. Furthermore, the tutorials, visual cues, and other interaction paradigms can make the user feel less ownership and personal satisfaction with the resultant work.

These and other disadvantages may exist with respect to drawing, particularly using touch-screen or other low fidelity devices.

BRIEF SUMMARY OF THE INVENTION

Embodiments of the present invention provide benefits and/or solve one or more of the foregoing or other problems in the art with systems and methods for assisting users to make drawings and sketches using computing devices. In particular, one or more embodiments provide an image on top of which a user can draw strokes. As a user draws a stroke, geometrically corrections are made to reposition and/or reshape the stroke toward a "correct" position or shape. To further improve the user's strokes, parametric adjustments are made to emphasize "correctly" drawn lines and de-emphasize "incorrectly" drawn lines.

The methods and systems disclosed herein can allow users with little or no training to create visually pleasing drawings. In particular, systems and methods of one or more embodiments can help correct the geometric placement of a user's lines due to inexperience, uncertainty, and/or the use of low-fidelity input devices. Additionally, parametric adjustments can convey structural details and lighting effects. In one or more embodiments, the systems and methods disclosed herein can provide such benefits while maintaining a user's individual style so as to produce drawings that help provide the user with a sense of ownership and a high degree of personal satisfaction.

Additional features and advantages of exemplary embodiments of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter. The foregoing summary is not an extensive overview, and it is not intended to identify key elements or indicate a scope of the invention. Rather the foregoing summary identifies aspects of embodiments of the invention as a prelude to the detailed description presented below.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which:

FIG. 2A illustrates a computing device displaying an image to be drawn over by a user in accordance with one or more embodiments of the present invention;

FIG. 2B illustrates the computing device of FIG. 2A displaying a guidance map of the image of FIG. 2A in accordance with one or more embodiments of the present invention;

FIG. 2C illustrates the computing device of FIG. 2A displaying a user stroke drawn over the image of FIG. 2A in accordance with one or more embodiments of the present invention;

FIG. 2D illustrates the user stroke of FIG. 2C and a smoothed version of the user stroke in accordance with one or more embodiments of the present invention;

FIG. 2E illustrates the computing device and image of FIG. 2A and a geometrically-corrected stroke in accordance with one or more embodiments of the present invention;

FIG. 2F illustrates a parametrically adjusted version of the geometrically-corrected stroke of FIG. 2E in accordance with one or more embodiments of the present invention;

DETAILED DESCRIPTION

Figure 1:
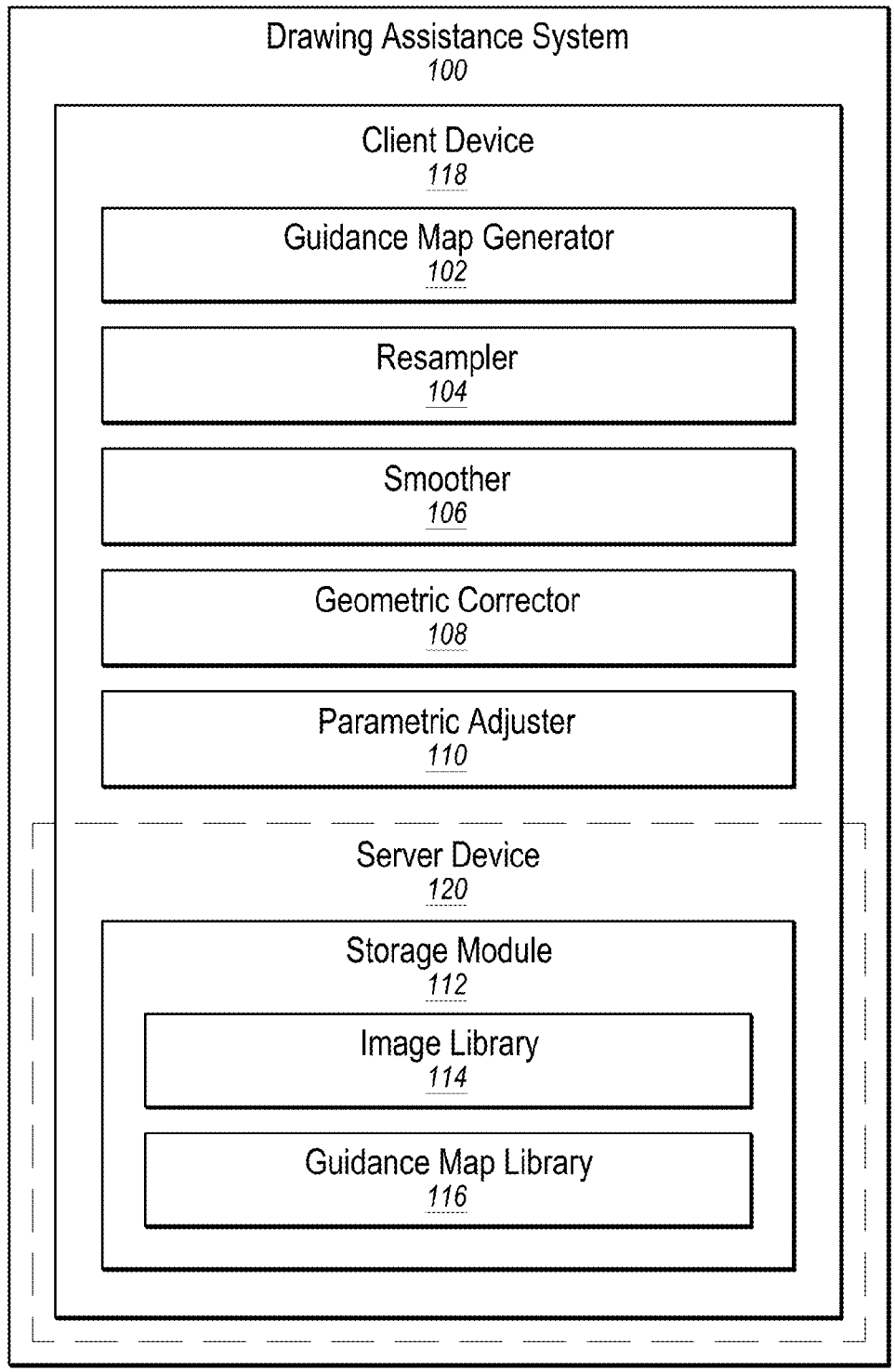
FIG. 1 illustrates a drawing assistance system in accordance with one or more embodiments of the present invention.

One or more embodiments of the present invention include a drawing assistance system that helps a user create an original drawing or sketch. In particular, the drawing assistance system provides an image on top of which a user can draw. In particular, one or more embodiments provide an image on top of which a user can draw strokes. As a user draws a stroke, the user stroke is geometrically corrected by moving the stroke toward a position in which the line "should" have been drawn. To further improve the user drawn lines, the drawing assistance system makes parametric adjustments to emphasize "correctly" drawn lines and de-emphasize "incorrectly" drawn lines.

The systems and methods disclosed herein can allow users with little or no training to create visually pleasing drawings.

As mentioned above, the systems and methods disclosed herein can make geometric corrections to a user's strokes. As used herein, the terms "geometric corrections" or "geometrically correcting" refers to moving, repositioning, and/or reshaping user drawn strokes or lines (or portions thereof) toward "correct" positions and/or shapes as defined by one or more guidance maps. For example, geometric corrections can move, reposition, and/or reshape user drawn strokes or lines misplaced and/or misshapen due to a lack of control or uncertainty. Moreover, geometric corrections can aid skilled artists using low-fidelity input devices (such as a touch-screen, a mouse, or a trackpad) by compensating for misalignments due to the "thick finger" problem.

The systems and methods disclosed herein can provide the geometric corrections while also maintaining stylistic properties of the user's original stroke. In particular, stylistic choices or characteristics of the user's original stroke (such as stroke quality, length, shape, and curvature) can be at least partially maintained despite geometrically correcting the user's stroke. Maintaining a user's individual style can help provide the user with a sense of ownership and a connection to the output drawing, as well as a high degree of personal satisfaction for creating a higher quality output drawing.

In addition to geometrically correcting a user's strokes, another way one or more embodiments of the present invention can further help provide a visually pleasing drawing is by parametrically adjusting a user's strokes. As used herein, the terms "parametric adjustments" or "parametrically adjusting" refers to emphasizing or de-emphasizing lines based on whether they are "correctly" drawn or "in-correctly" drawn as defined by one or more guidance maps. Parametric adjustments can help reduce the negative effects of miss-drawn or miss-placed lines by lightening or otherwise de-emphasizing them. Along related lines, parametric adjustments can help emphasize correctly drawn lines by darkening them or increasing their opacity. Additionally, parametric adjustments can help convey depth, structural details, and lighting effects.

In order to help provide the user with a sense of ownership for the output drawing, in one or more embodiments, the system modifies each input stroke as the stroke is drawn by the user. In other words, as the user draws a stroke, the system does not display the user stroke, but rather, the system displays the geometrically-corrected and parametrically-adjusted stroke. In such embodiments the correction and adjustment process is imperceptible to the user, which can reduce the user's awareness of the amount of any geometric corrections and parametric adjustments. In alternative embodiments, the user can view the input strokes momentarily as they are drawn to get an idea of the corrections and adjustments the system performs. Additionally or alternatively, the system can provide an option to the user to view the input drawing of original strokes so as to be able to compare the input drawing to the output drawing made up of the geometrically-corrected and parametrically-adjusted strokes.

Along similar lines, in embodiments where the correction process is imperceptible to the user, the guidance map(s) are not provided to the user and are used on the backend to correct the user strokes. In other words, the user may not view the guidance map(s). Alternatively, the system can provide an option to the user to view the guidance map(s) so as to be able to compare the input drawing, the output drawing, and the guidance map(s).

FIG. 1 illustrates an embodiment of an exemplary drawing assistance system 100. The drawing assistance system 100 may include, but is not limited to, a guidance map generator 102, a resampler 104, a smoother 106, a geometric corrector 108, a parametric adjustor 110, and a storage module 112. Each of the components 102-112 of the drawing assistance system can be in communication with one another using any suitable communication technologies. As shown by FIG. 1, the drawing assistance system 100 can include one or more computing devices (i.e., client device 118, server device 120).

It will be recognized that although the components 102-112 of the drawing assistance system 100 are shown to be separate in FIG. 1, any of components 102-112 may be combined into fewer components, such as into a single component, or divided into more components as may serve a particular implementation. The components 102-112 can comprise software, hardware, or both. For example, the components 102-112 can comprise one or more instructions stored on a computer-readable storage medium and executable by processors of one or more computing devices (e.g., client device 118 and/or server device 120). When executed by the one or more processors, the computer-executable instructions of the drawing assistance system 100 can cause the computing device(s) 118, 120 to perform the drawing assistance methods described herein. Alternatively, the components 102-112 can comprise hardware, such as a special purpose processing device to perform a certain function or group of functions. Additionally or alternatively, the components 101-112 can comprise a combination of computer-executable instructions and hardware.

Furthermore, the components 102-112 of the drawing assistance system 100 may, for example, be implemented as a stand-alone application, as a module of an application, as a plug-in for applications including image processing applications, as a library function or functions that may be called by other applications such as image processing applications, and/or as a cloud-computing model. Thus, the components of the drawing assistance system 100 may be implemented as a stand-alone application, such as a desktop or mobile application. Alternatively or additionally, the components of the drawing assistance system 100 may be implemented in any image processing application, including but not limited to ADOBE PHOTOSHOP, ADOBE PHOTOSHOP ELEMENTS, and ADOBE ILLUSTRATOR. "ADOBE", "PHOTOSHOP", "ELEMENTS", and "ILLUSTRATOR" are either registered trademarks or trademarks of Adobe Systems Incorporated in the United States and/or other countries.

FIGS. 2A-2E and the related description provide an overview of a drawing assistance method that can be performed by the drawing assistance system 100. FIG. 2A illustrates a client device 202 on which a drawing assistance system 100 or one or more of the drawing assistance components 102-112 may be implemented. In other words, the client device 202 is one example of a computing device that can form part of the drawing assistance system 100. In the embodiment illustrated in FIG. 2A, the client device 202 comprises a tablet with a touch screen 204. A tablet with the touch screen 204 is only one type of client device 118 that can be used as part of the drawing assistance system 100. For example, in alternative embodiments the client device 202 can comprise any number of different types of computing devices, such as those described below in reference to FIG. 9.

To aid the user and reduce the intimidation of a blank page, the drawing assistance system 100 can provide an image 206 in a user interface 207. The drawing assistance system 100 can provide the image 206 by instructing the client device 202 to display the image 206 via a display device (e.g., touch screen 204). The image 206 can comprise an image that the user selects from the image library 114 of the storage module 112. The image library 114 can include a plurality of images that users can select to draw. Additionally or alternatively, the user can import/upload an image to the drawing assistance system 100, such as from a local drive, the Internet, or import it directly from a camera of a device upon which the drawing assistance system 100 is implemented. When a user imports or otherwise selects an image 206 not saved in the image library 114, the drawing assistance system 100 can automatically add it to the image library 114 for future use.

As shown by FIG. 1, the storage module 112 including the image library 114 and the guidance map library 116 can be located in full or in part at the client device 118. Alternatively, the storage module 112 including the image library 114 and the guidance map library 116 can be located at the server device 120. In such embodiments, the client device 118 can communicate with the server device 120 via a network to retrieve images or guidance maps.

The image 206 shown in FIG. 2A is the face of an actor. Faces are often challenging to draw, yet are uniquely important in visual communication. As such, example embodiments of the present invention are described herein in reference to correcting user drawings of faces. One will appreciate in light of the disclosure herein that the present invention is not limited to correcting drawings of faces. Indeed, the drawing assistance system 100 can aid the user in drawing essentially any image.

As mentioned previously, the drawing assistance system 100 can use one or more guidance maps as a guide for correcting user strokes. The drawing assistance system 100 can produce or retrieve guidance maps for the image 206. As used herein, the term "guidance map" refers to an idealized drawing of the image or other guide indicating features of the image. The guidance map(s) provides the baseline for geometric corrections and parametric adjustments. For example, during geometric correction, the drawing assistance system 100 moves (e.g., repositions and/or reshapes) the user's strokes to, or toward, the lines or edges of the guidance map. In other words, the guidance map(s) can indicate what lines the user "should" draw and where the user "should" draw the lines. Exemplary guidance maps include the result of an edge detection filter applied to an image, an artist sketch of the image, and a consensus of user drawings of the image 206.

In embodiments were the correction and adjustment process is imperceptible to the user, the guidance map(s) are not provided to the user. In other words, the user may not view the guidance map(s). Alternatively, the system can provide an option to the user to view the guidance map(s) so as to be able to compare the input drawing, the output drawing made up of the geometrically-corrected and parametrically-adjusted strokes, and the guidance map(s).

In one or more embodiments, the guidance map generator 102 can produce a guidance map from a selected image 206. For example, FIG. 2B illustrates one embodiment of a guidance map 208 of the image 206 of FIG. 2A. To produce the guidance map 208, the guidance map generator 102 can run an edge detection filter on the image 206 of FIG. 2A. The guidance map 208 provides features (e.g., lines or edges) to which the user's strokes can be geometrically corrected and/or parametrically adjusted. In one or more embodiments, the guidance map generator 102 can run an extended Difference-of-Gaussians (XDoG) filter with an edge setting on the image 206 to produce the guidance map 208. Suitable examples of XDoG filters are described in Holger Winnemoller et al., *XDoG: An eXtended Difference-of-Gaussians Compendium including Advanced Image*, 36(6) STYLIZATION COMPUTERS & GRAPHICS 740-753 (2012), the entire contents of which are hereby incorporated by reference in their entirety. As shown by FIG. 2B, the XDoG filter with an edge setting is suitable to approximate the lines that an artist might draw when sketching the image 206. One will appreciate that other edge detection filters, such as the Canny edge detector or the Sobel detector, can provide suitable guidance maps as well.

Referring now to FIG. 2C, the user can draw a user stroke 210 using the input device (i.e., touch screen 104). For example, the user can press a finger or a stylus against the touch screen 204 and move the finger or stylus along the touch screen 204 to draw a feature of the image 206. The drawing assistance system 100 can detect the user stroke 210. As used herein the term "stroke" refers to at least a portion of a line. For example, a stroke can comprise an entire line defined by a starting point at which the user engages an input device, an ending point at which the user disengages the input device, and a path between the starting point and the ending point. Alternatively, a stroke can comprise only a portion of a line defined by a starting point at which the user engages an input device, an ending point at which the user disengages the input device, and a path between the starting point and the ending point.

FIG. 2C further illustrates that user interface 207 can include one or more controls or options 212. In one or more embodiments, the user interface 207 can include the option 212a to use the original strokes as input by the user. Additionally, the user interface 207 can include the option 212b to smooth the user strokes. When the option 212b to smooth the user strokes is selected, the resampler 104 can resample the user stroke 210 to determine points defining the stroke 210. The smoother 106 can then smooth the user stroke(s) 210 by fitting a line to the points determined during resampling to create a smoothed user stroke 211, as shown by FIG. 2D.

As shown by FIG. 2C, the user intended the stroke 210 to be the right side of the face of the actor in the image 206, but the user stroke 210 is offset or misplaced. The drawing assistance system 100 can determine which feature of the image the user is intending to draw. For example, the drawing assistance system 100 can compare the user stroke 210 to the guidance map 208 to determine a feature or guidance line 213 (i.e., the nearest line or edge) of the guidance map 208 (see FIG. 2B).

As shown by FIG. 2E, upon detecting the feature of the image that the user is intending to draw (e.g., determining that guidance line 213 corresponds to the user stroke 210), the geometric corrector 108 can geometrically correct the user stroke 210 to create a geometrically-corrected stroke 214. In particular, the geometric corrector 108 can move (e.g., reposition and/or reshape) the user stroke 210 toward, or to, the position of the guidance line 213 of the guidance map 208 (FIG. 2B).

When geometrically correcting the user stroke 210, the geometric corrector 108 can retain style elements or line variations of the user stroke 210. For example, as shown by FIG. 2D, the user stroke 210 includes input variations 210a and 210b. The geometrically-corrected stroke 214, as shown in FIG. 2F, can include variations 214a, 214b based on the input variations 210a and 210b. In other words, the geometrically-corrected stroke 214 does not align precisely with the guidance line 213 due to the retention of variations in the user stroke 210. The retention of the user's style can help ensure each drawing is unique because no two users will provide identical user strokes 210.

To further improve the lines the user has drawn, the parametric adjuster 110 can parametrically adjust the geometrically-corrected stroke 214 to create a parametrically-adjusted stroke 216, as shown by FIG. 2F. In performing parametric adjustments, the parametric adjuster 110 emphasizes lines that are deemed to have "correct" line characteristics. For example, line characteristics that are analyzed for parametric adjustment can include line location (e.g., position), orientation, shape or any other line characteristic. In addition, while performing parametric adjustments, the parametric adjuster 110 de-emphasizes lines deemed to have "in-correct" line characteristics.

More specifically, the parametric adjuster 110 compares the geometrically-corrected stroke 214 to the guidance line 213 of the guidance map 208. When making the comparison, the parametric adjuster 110 detects variations 214a, 214b of the geometrically-corrected stroke 214 that deviate from the guidance line 213. The parametric adjuster 110 also detects portion(s) 214c of the geometrically-corrected stroke 214 that align, or substantially align, with the guidance line 213. The parametric adjuster 110 then emphasizes the portion(s) 214c of the geometrically-corrected stroke that align well with the guidance line 213. For example, FIG. 2F shows that the portion 216c of the parametrically-adjusted stroke 216 that corresponds to the portion 214c of the geometrically-corrected stroke 214 is emphasized. Similarly, the parametric adjuster 110 de-emphasizes lines, or portions thereof 214a, 214b, that do not align with the guidance line 213. For instance, FIG. 2F shows that the portions 216a, 216b of the parametrically-adjusted stroke 216 that correspond to the portions 214a, 214b of the geometrically-corrected stroke 214 are de-emphasized.

The parametric adjuster 110 can provide emphasis using one or more of a number of techniques. To provide emphasis the parametric adjuster 110 can modify one or more visual characteristics of the geometrically-corrected stroke 214. For example, the drawing assistance system can modify line thickness, line opacity, line density, and/or line color. One will appreciate in light of the disclosure herein, the parametric adjustments can help account for lighting, depth, contour, and other more advanced stylistic effects.

Figure 3:
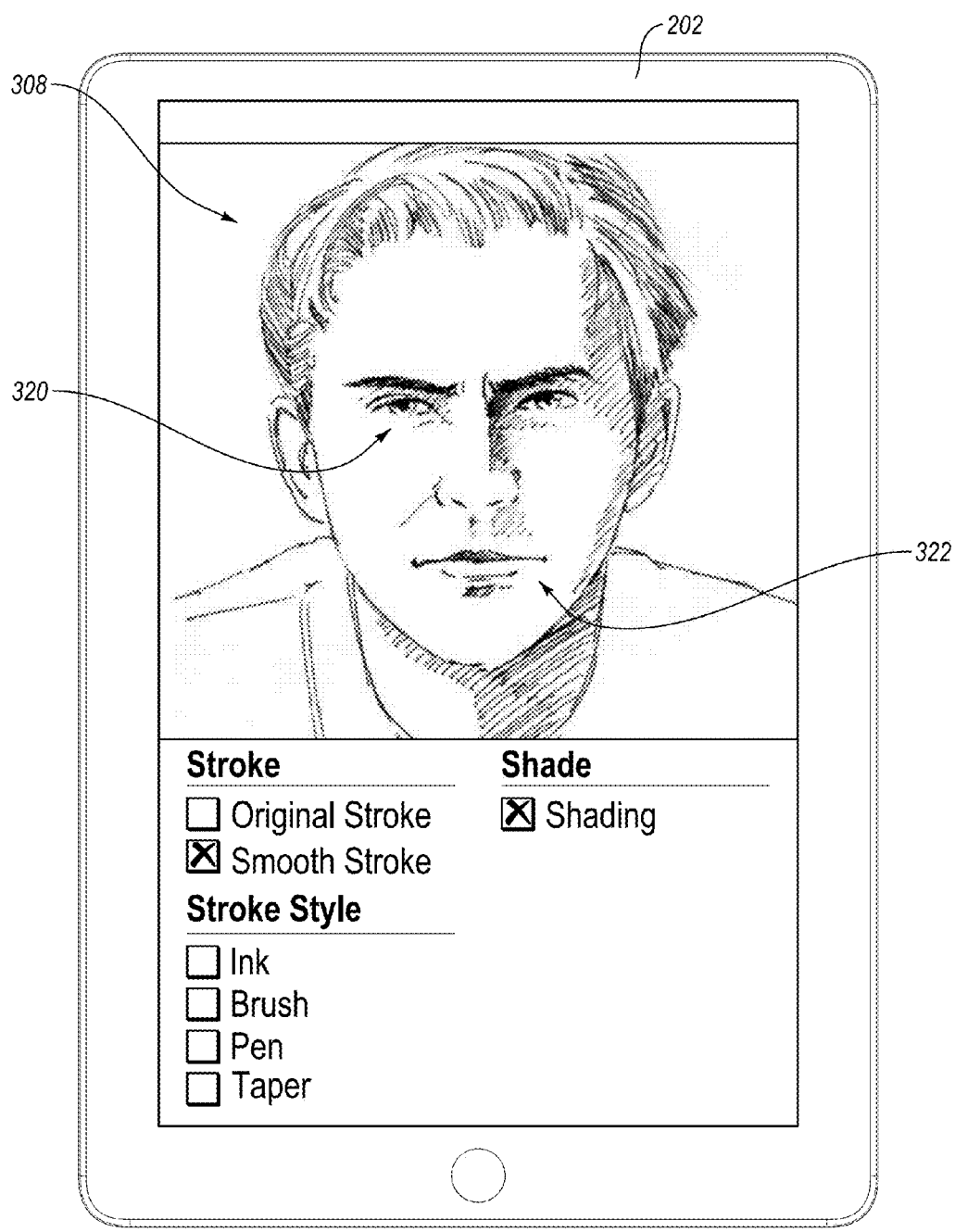
FIG. 3 illustrates another guidance map of the image of FIG. 2A in accordance with one or more embodiments of the present invention.

In particular, when an advanced guidance map is used, the parametric adjustments can help incorporate the advanced stylistic elements of the guidance map into the geometrically-corrected stroke 214. For example, FIG. 3 illustrates a guidance map 308 of the image 206 of FIG. 2A. The guidance map 308 was created from an artist sketch. As shown by arrows 320 and 322, the eyes and the lips of the guidance map 308 are not completely outlined to provide an artistic effect. As guidance map 308 indicates, even if a user's strokes are aligned with image features, it doesn't mean that the line should have been drawn. Therefore, when a user draws a stroke not included in the guidance map 308, the drawing assistance system may recognize the stroke as being misplaced or otherwise drawn incorrectly. As such, when making parametric adjustments, the parametric adjuster 110 may de-emphasize any lines not included in the guidance map. In this manner the drawing assistance system 100 can produce drawings with lighting, depth, contour, and other advanced effects commonly not drawn by novices. Additionally, the drawing assistance system 100 can help minimize the effects of a user drawing what they "know," as opposed to what is "depicted" in the reference image 206.

The geometric corrections and parametric adjustments described above in relation to user stroke 210 can be repeated for each stroke the user draws. Furthermore, each of the corrections/adjustments to the user stroke(s) 210 can take place in substantially real-time. In other words, the drawing assistance system may correct and/or adjust the user's strokes 210 as they are drawn/rendered on the client device 202. As previously mentioned, having the correction methods and process be imperceptible to the user can reduce the user's awareness of the corrections and elicit a feeling that the user drew the output image.

Figure 4C:
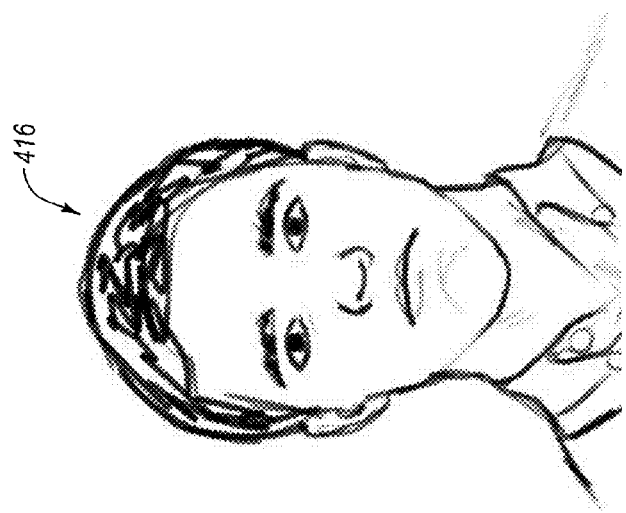
FIG. 4C illustrates an output drawing formed by geometrically and parametrically adjusting the user drawn sketch of FIG. 4B in accordance with one or more embodiments of the present invention.
Figure 4B:
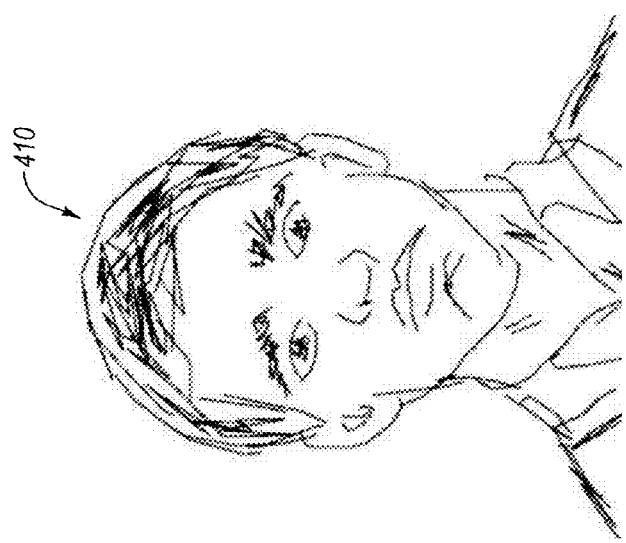
FIG. 4B illustrates a user drawn sketch of the image of FIG. 4A in accordance with one or more embodiments of the present invention.
Figure 4A:
FIG. 4A illustrates another image to be drawn over by a user in accordance with one or more embodiments of the present invention.

One will appreciate in light of the disclosure herein, that the drawing assistance system can beautify, correct, align, and displace user strokes to more accurately represent a source image. The amount and extent of the corrections the drawing assistance system performs can depend upon the accuracy of the user strokes. FIGS. 4A-4C illustrate the effectiveness of the drawing assistance systems and methods described herein. In particular, FIG. 4A illustrates a source image 406. FIG. 4B illustrates an input drawing 410 of user strokes drawn by a user over the image 406. FIG. 4C illustrates an output drawing 416 created by geometrically correcting and parametrically adjusting the user strokes of the input drawing 410. As shown by a comparison of the input drawing 410 and the output drawing 416, the geometrically-corrected and parametrically-adjusted output drawing 416 can provide a significant improvement over the input drawing 410.

One or more embodiments of the present invention can provide a user with a number of drawing options, stylistic or otherwise. In particular, the drawing assistance system can provide various stroke/pen/brush styles. For example, FIG. 2C illustrates exemplary stroke options 212c-112f. The user can select the ink 212c, brush 212d, pen 212e, or the taper 212f options for the strokes the user draws over the image 206. The use of the stroke options 212 can provide another way for users to personalize their drawing. One will appreciate that the present invention is not limited to the stroke options 212c-112f shown in FIG. 2C. The drawing assistance system 100 can provide additional or alternative brush/stroke options or other image processing tools such as those provided by ADOBE PHOTOSHOP.

Additionally, when geometrically correcting and parametrically adjusting the user's stroke, the drawing assistance system can maintain stylistic properties of the user's original stroke. In particular, stylistic choices or characteristics of the user's original stroke (such as stroke quality, length, shape, and curvature) can be at least partially maintained despite geometrically correcting and parametrically adjusting the user's stroke. Maintaining a user's individual style can leave the user with a sense of ownership and a high degree of personal satisfaction for the output drawing.

Figure 5C:
FIG. 5C illustrates yet another output drawing formed by geometrically and parametrically adjusting the user strokes in accordance with one or more embodiments of the present invention.
Figure 5B:
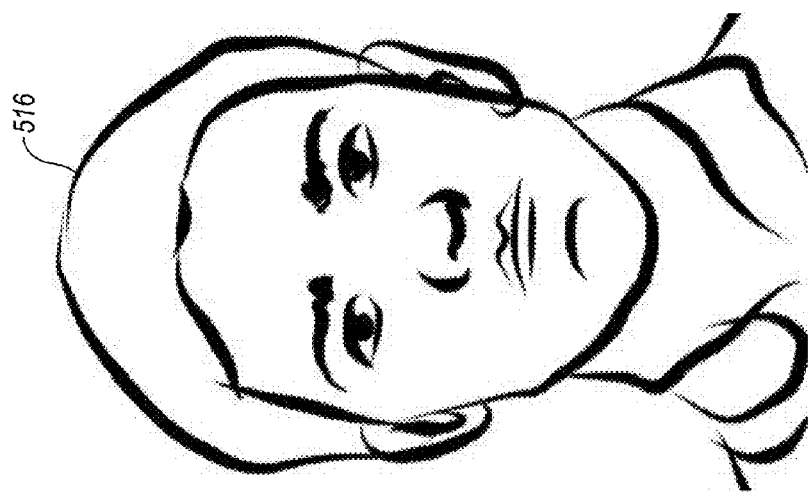
FIG. 5B illustrates another output drawing formed by geometrically and parametrically adjusting the user strokes in accordance with one or more embodiments of the present invention.
Figure 5A:
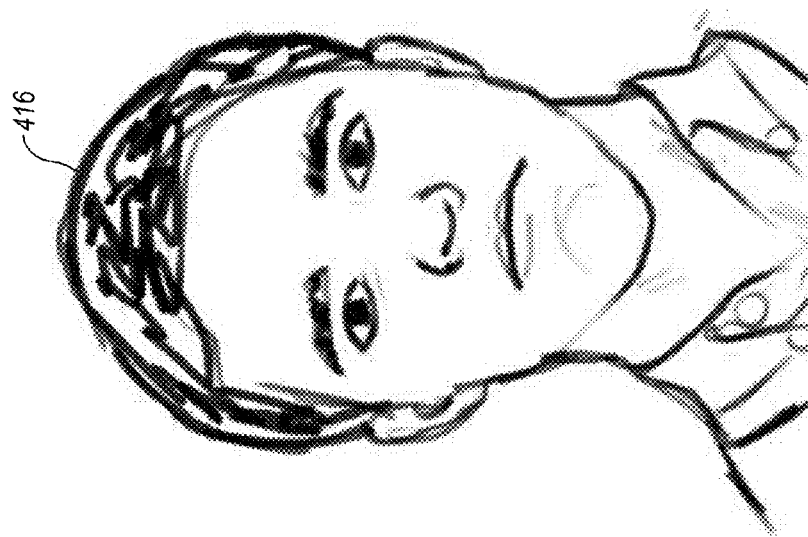
FIG. 5A illustrates the output drawing of FIG. 4C.

One will appreciate in light of the disclosure herein that the stroke options 212, in combination with maintaining the style of a user's stroke, can help ensure that each drawing, even if based on the same image, differs in one or more aspects. For example, FIGS. 5A-5C illustrate three output drawings (i.e., geometrically-corrected and parametrically-adjusted drawings) 416, 516, 518 of the image 406. As shown by FIGS. 5A-5C, each output drawing 416, 516, 518 provides an aesthetically pleasing drawing, while preserving distinctive style elements.

In addition to correcting or adjusting lines that delineate contours, one or more embodiments can also modify or correct shading or fill lines. In order to distinguish between contour lines and shading or fill lines, a user interface 207 can include a shading option 230 as shown by FIG. 2A. When the shading option 230 is un-selected, a user's stroke(s) is treated as a contour line and is corrected as described above. When the shading option 230 is selected, the user's stroke(s) is treated as shading or fill and is corrected using modified guidance data and adjustment procedures.

Figure 6:
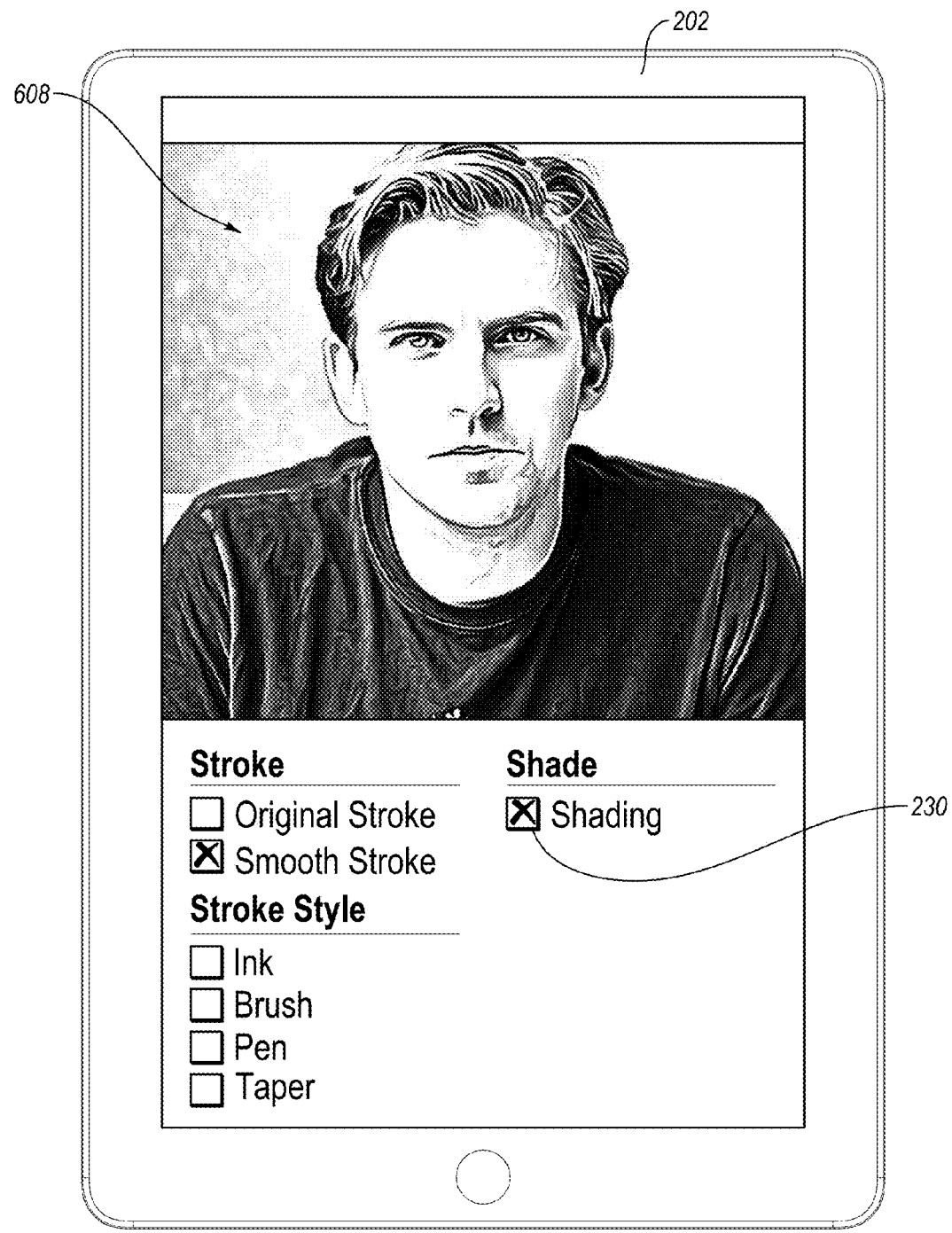
FIG. 6 illustrates another guidance map of the image of FIG. 2A in accordance with one or more embodiments of the present invention.

In particular, the drawing assistance system can provide a shading guidance map as a baseline for correcting shading lines. One example of a suitable shading guidance map 608 is shown in FIG. 6. The shading guidance map 608 of FIG. 6 is the result of applying a XDoG filter with brightness response settings to the image 206 of FIG. 2A. As shown, the shading guidance map 608 can provide an indication of the position and configuration of acceptable shading. Similar to the geometric corrections described above, the shading strokes drawn by a user can be moved (e.g., repositioned and reshaped) based on the shading guidance map 608. One will appreciate in light of the disclosure herein that the exact placement of shading lines is less important compared with contour lines. The aggregate darkness (as a combination of line density and thickness) can be controlled to ensure proper shading. In one example, the drawing assistance system 100 uses the XDoG edge response guidance map 208 to constrain shading strokes within reasonable boundaries, while the drawing assistance system 100 uses the shading guidance map 608 to locally move strokes and modify the thickness and/or opacity to achieve a desired tonal density.

FIGS. 1-5C provide some detail regarding the geometric correction and parametric adjustment processes of one or more embodiment of the present invention. Additional or alternative details will now be provided for various sub-processes.

Stroke Resampling

As a user draws a stroke, the drawing assistance system 100 can resample the stroke. Resampling the stroke can break the stroke down into points that provide the framework of the stroke. The resampled stroke points are then used as control points. The drawing assistance system 100 can then use the control points to smooth or geometrically correct the stroke.

In one or more embodiments the drawing assistance system 100 resamples user strokes based on curvature and distance. A curvature-based approach can increase the sampling density in segments of high curvature and reduce the sampling density in segments of low curvature. For example, a circle may have many samples (e.g., 24), while a straight line may be represented by two samples.

In particular, for each incoming stroke point $x_i$ at scale s, $m_1, m_2, m_3$ are new resampled stroke points before $x_i$. If a metric $z_i$ (defined below) is greater than 1, $x_i$ is taken as a new sample point: $x_i \leftarrow m_{k+1}$. If the metric $z_i$ is less than 1, $x_i$ is skipped and $x_{i+1}$ is examined. The metric $z_i$ is defined as follows:

$$z_i = \frac{r_i \beta_i \Delta_{\theta i}}{2\pi}$$

where $\beta = \max(0, \min(1, r-t_2\sqrt{s}))$; r is the distance between $x_i$ and $m_k$; and $\Delta_{\theta i}$ is the absolute difference of orientations between $\theta < x_i, m_k >$ and $\theta < m_{k-1}, m_k >$. Thresholds $t_1$ and $t_2$ control the sampling densities for curve and distance, respectively.

In alternative embodiments other resampling techniques may be used. For example, other suitable resampling techniques include, but not are limited to, uniform distance sampling or temporal sampling.

Stroke Smoothing

As alluded to earlier, the user can select the option to smooth the user strokes. In alternative embodiments all user strokes can be automatically smoothed. In any event, smoothing the user strokes can reduce or eliminate jagged and uncertain user strokes. Thus, smoothing the user strokes can improve the overall quality of not only the user strokes, but the overall output drawing as well.

To smooth the user strokes, a curve approximation can be fit to the control points determined during the stroke resampling process. Alternatively, a curve approximation can be fit to the geometrically-corrected points. Smoothing the points can capture the shape of the stroke, while reducing jittery portions as shown by FIG. 2D. In one or more embodiments a spline function is applied to the points to smooth the user stroke. For example, each stroke can be interpolated by fitting the points with a cubic B-spline curve approximation. In alternative embodiments, other smoothing techniques can be used. For example, other suitable smoothing techniques include, but not are limited to, sliding-average smoothing or Laplace smoothing.

Guidance Maps

As mentioned above, the drawing assistance system 100 can use one or more guidance maps as a baseline of what lines the user "should" be drawing and where the lines "should" be placed. The drawing assistance system 100 can retrieve a previously generated guidance map for an image the user wishes to sketch, or alternatively, the drawing assistance system 100 can generate a guidance map. Exemplary guidance maps include the result of an edge detection filter applied to the image (see 208 of FIG. 2B), an artist sketch of the image (see 608 of FIG. 6), or a consensus of user drawings of an image.

Geometric Correction

As a user draws a stroke, the drawing assistance system 100 can determine which feature of the image the user is intending to draw. For example, the drawing assistance system 100 can compare the user stroke to the guidance map to determine the line/edge of the guidance map nearest to the user stroke in position and orientation. Upon detecting the guidance line that the user is intending to draw, the drawing assistance system can geometrically correct the user stroke by moving (e.g., repositioning and/or reshaping) the user stroke toward, or to, the line of the guidance map that the user is intending to draw.

In particular, geometric correction is modeled as an energy minimizing process for each user input with the energy function defined, at least in part, as:

$$E = \alpha E_{guidance} + \gamma E_{variation}$$

The guidance map (i.e., the ideal drawing), and the variations of the user's strokes with the guidance map, can form the basis of the energy function. In other words, the energy function can help ensure that the user's strokes can be aligned according to the guidance map while preserving variations/styles of the original user stroke. Given the sequential input points $x_1, x_2, \ldots x_n$ in each user stroke and the guidance points $g_1, g_2, \ldots g_n$ the energy function allows geometrically-corrected points $p_1, p_2, \ldots p_n$ to be determined.

The $E_{guidance}$ term helps align the user's stroke with the guidance map and is defined as:

$$\sum_{i=1}^{n} \frac{1}{d_i} |p_i - g^*_{x_i}|^2$$

where $g^*_{x_i}$ is $x_i$'s closet point in the guidance map. $g^*_{x_i}$ can be determined using a nearest neighbor search. Each point can be defined using (X, Y, Curvature). Thus, when finding the nearest guidance point $g^*x_i$, the difference in position and the curvature can be compared. Thus, if two guidance points are equally spaced from an input point, the guidance point with a curvature closest to that of the input point can be selected. The curvature of a point can be defined as $$\frac{d\phi}{ds}$$

where $\phi$ is the angle of inclination of the tangent of the line at the point. A Kd-tree implementation can also be used to speed up the nearest neighbor search process to achieve real-time, or substantially real time, corrections.

$d_i = |x_i - g^*_{x_i}|$, the Euclidean distance between $x_i$ and $g^*_{x_i}$. In other words, $d_i$ makes $E_{guidance}$ inversely proportional to the distance between the user's stroke (or points defining the stroke) and the nearest line/edge (or points defining the line/edge) of the guidance filter. $d_i$ reduces geometric corrections of user strokes, or portions thereof, that do not have a close corresponding line/edge in the guidance map. For example, referring to the image 206 of FIG. 2A and the guidance map 308 of FIG. 3, if a user draws a user stroke for the under part of the right eye (see arrow 320), there is no corresponding line in the guidance map 308. As such, $d_i$ can help ensure that the user stroke corresponding to the under part of the right eye is not greatly corrected. Furthermore, as explained in greater detail below, user strokes with no corresponding lines in the guidance map can be de-emphasized during parametric adjustments.

The $E_{guidance}$ term moves the input stroke (i.e., each point of the user stroke) to, or at the very least toward, the position of the line of the guidance map where the user "should have" drawn the stroke. The second term $E_{variation}$ serves to counterbalance the $E_{guidance}$ term to help ensure that each output drawing of the same image is not exactly the same as the guidance map by preserving the style of the user's original strokes. $E_{variation}$ is defined as:

$$\sum_{i=2}^{n} |(p_i - p_{i-1}) - (x_i - x_{i-1})|^2$$

The $E_{variation}$ term can minimize the difference of neighboring points before and after correction. In other words, the $E_{variation}$ term can help maintain the shape of the original user stroke by ensuring that neighboring points move in sync. In particular, each user stroke is broken into a plurality of points. The style of the original user stroke dictates the distances between the points making up the stroke, and thus, the shape of the stroke. The $E_{variation}$ term helps keep the distances between neighboring points in the geometrically-corrected stroke the same or similar to the distances between the corresponding neighboring points in the original user stroke.

The weights $\alpha$ and $\gamma$ can control the tradeoff between aligning the user's strokes with the guidance map and maintaining the characteristics/shape of the original user stroke. In particular, as $\alpha$ is increased and $\gamma$ is decreased, the geometric correction process will retain less of the characteristics of the user's original strokes and align the user's strokes more closely with the guidance map. On the other hand, as $\alpha$ is decreased and $\gamma$ is increased, the geometric correction process can retain more of the characteristics of the user's original strokes and align the user's strokes less closely with the guidance map. In one or more embodiments the weights $\alpha$ and $\gamma$ are automatically selected to optimize the look and feel of the output drawings. In alternative embodiments the user can modify $\alpha$ and $\gamma$ to adjust how their drawings are corrected.

In or more embodiments the weights $\alpha$ and $\gamma$ can be selected based on the complexity/density of the image/guidance map. For example, a large $\gamma$, in addition to maintaining the style of the user's stroke, can avoid having one part of a stroke being moved toward one line of the guidance map and another part of the stroke being moved toward another line of the guidance map.

Parametric Adjustment

One will appreciate that due to $E_{variation}$ and users drawing what they "know," each geometrically-corrected stroke can still be offset or otherwise displaced from the guidance map. As part of the parametric adjustment process, the drawing assistance system can determine which geometrically-corrected strokes have been drawn "correctly" and which lines have been drawn "incorrectly." In particular, the drawing assistance system can compare the geometrically-corrected strokes to the guidance map to determine how much they deviate from the guidance map. Then based on the amount of deviation or alignment with the guidance map, the drawing assistance system can emphasize lines in alignment with the guidance map and de-emphasize the lines that deviate from the guidance map.

The deviation or error for each point $p_i$ in a geometrically-corrected stroke can be defined as the distance between $p_i$ and its closest point in the guidance map. More particularly, the deviation or error can be defined as:

$$e = dist(p_i, g_i^*)$$
$$= \sqrt{(X_{p_i} - X_{g_{p_i}^*})^2 + (Y_{p_i} - Y_{g_{p_i}^*})^2 + \eta(Curvature_{p_i} - Curvature_{g_{p_i}^*})^2}$$

The first two terms (i.e., $(X_{pi}-X_{g^*_{pi}})^2+(Y_{pi}-Y_{g^*_{pi}})^2$) represent the distance between the $p_i$ and its closest point in the guidance map. The third term (i.e., $\eta(Curvature_{pi}-Curvature_{g^*_{pi}})^2$) measures the difference of curvature between the two points. Thus, the third term ensures that a geometrically-corrected stroke that is near a line of the guidance map, but curves differently from the line of the guidance map is not overly emphasized.

The parametric adjustments can provide emphasis using one or more of a number of techniques. For example, the drawing assistance system can modify the line thickness. Thick lines stand out more in the image, so when making parametric adjustments the drawing assistance system can increase the width of well-placed lines and decrease the width of misplaced lines. Additionally or alternatively, the parametric adjustments can adjust the opacity of lines. For example, the drawing assistance system can ensure that well-placed lines are drawn opaque, while misplaced lines are drawn more transparent. When adjusting the opacity is not possible, the drawing assistance system can emulate opacity variation by simulating a brushing medium. For example, the drawing assistance system can break up strokes into individual lines (suggestive of light contact of a bristle brush with paper) and thereby reduce the perceived opacity of the overall stroke. In still further embodiments, the drawing assistance system can apply emphasis or de-emphasis using color. For example, the drawing assistance system can render the misplaced lines in a one color (e.g., light-gray) and render well-placed lines in another color or shade (e.g., dark grey).

Emphasis or de-emphasis can be applied based on the error value e for the geometrically-corrected stroke. For example, if the error for a line is below a predetermined amount or threshold, the parametric adjustments can emphasize the line. In particular, as the error value decreases, the emphasis can increase. On the other hand, if the error value is above the predetermined threshold, the parametric adjustments can de-emphasize the line. Indeed, as the error value increases, the de-emphasis can increase. If the error value is at or near the predetermined amount, the parametric adjustments can apply minimal emphasis or apply neither emphasis nor de-emphasis.

The drawing assistance system can apply the parametric adjustments globally (i.e., along the entire stroke) or locally (i.e., variations along a single stroke). For example, the parametrically-adjusted stroke 216 of FIG. 2F illustrates locally applied emphasis and de-emphasis. In one or more instances the locally assigned error value may not generate good visualization effects when the local errors change frequently along the same stroke. In such instances, the local errors can be smoothed along the same stroke by optimizing with a neighboring consistency penalty. A global error can be computed as an average of the local smoothed errors and then used to apply the emphasis or de-emphasis.

FIGS. 1-6, the corresponding text, and the examples, provide a number of different systems and devices for providing drawing assistance through geometric and parametric adjustments. In addition to the foregoing, embodiments of the present invention also can be described in terms of flowcharts comprising acts and steps in a method for accomplishing a particular result. For example, FIGS. 7 and 8 illustrate flowcharts of exemplary methods in accordance with one or more embodiments of the present invention.

Figure 7:
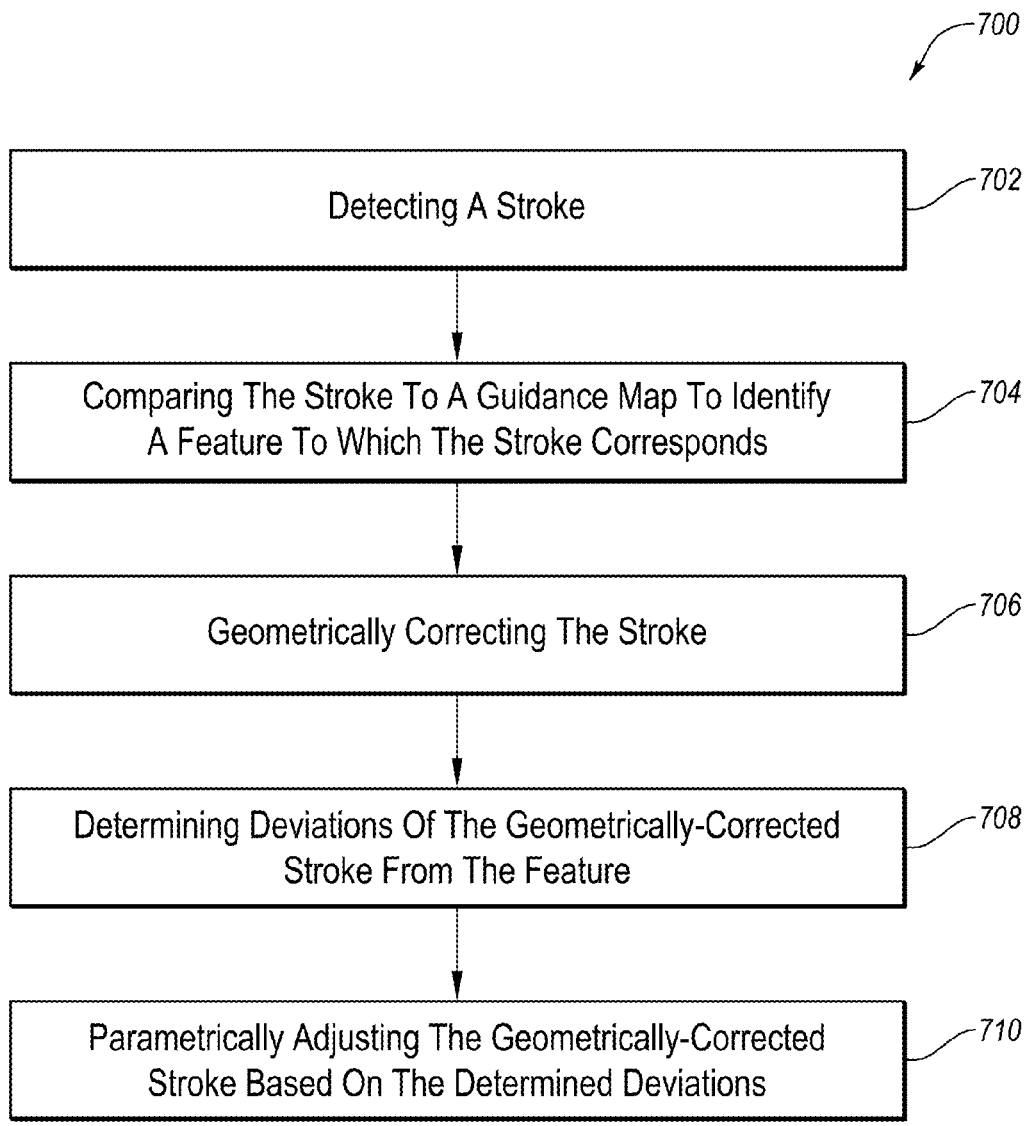
FIG. 7 illustrates a flowchart of a series of acts in a method of providing drawing assistance by geometrically and parametrically adjusting user strokes in accordance with one or more embodiments of the present invention.
Figure 8:
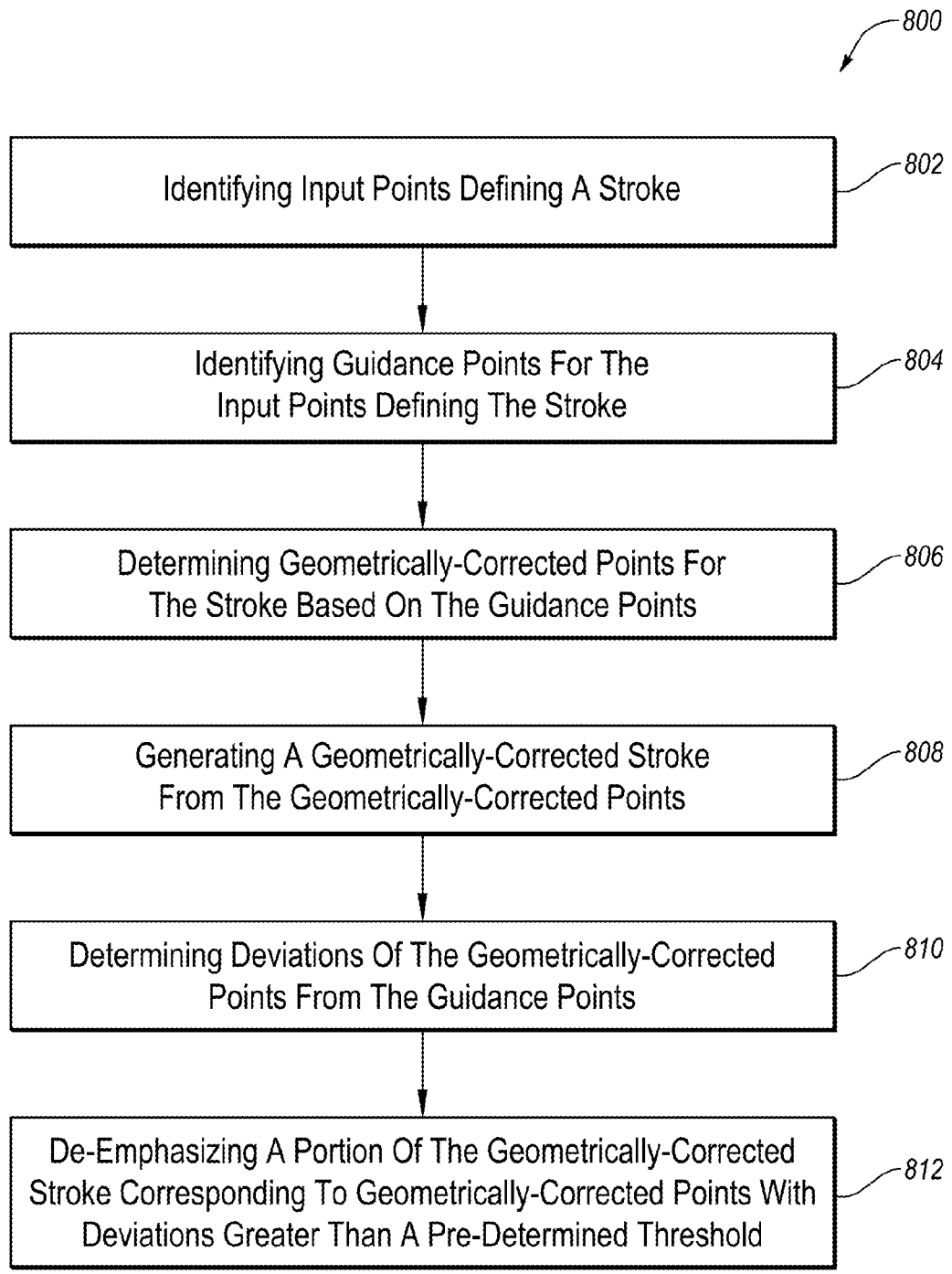
FIG. 8 illustrates a flowchart of a series of acts in another method of providing drawing assistance by geometrically correcting and parametrically adjusting user strokes in accordance with one or more embodiments of the present invention.

FIG. 7 illustrates a flowchart of one exemplary method 700 of providing drawing assistance to a user sketching an image 206 by geometrically correcting and parametrically adjusting user strokes 210. The method 700 includes an act 702 of detecting a stroke 210 drawn by a user. In particular, act 702 can involve detecting activation and movement of an input device (e.g., a mouse, touch screen, or trackpad). Act 702 can also involve detecting a starting point of the stroke 210, direction of travel of the stroke 210, and an ending point for the stroke 210. Act 702 can further involve detecting a position of the stroke 210.

The method 700 also includes an act 704 of comparing the stroke to a guidance map to identify a feature to which the stroke corresponds. In particular, act 704 can involve comparing the stroke 210 to a guidance map 208, 308, 608 of the image 206 to identify a feature 213 in the guidance map 208, 308, 608 to which the stroke 210 corresponds. For example, act 704 can involve identifying a guidance line 213 of the guidance map 208, 308, 608 near or nearest to the stroke 210. Identifying a guidance line 213 of the guidance map 208, 308, 608 near or nearest to the stroke 210, in one or more embodiments, involves determining the guidance line 213 of the guidance map 208, 308, 608 nearest to the stroke 210 in distance and curvature.

As part of act 704, or as an additional act, the method 700 can include generating the guidance map 208, 608. Generating the guidance map 208, 608 can involve applying an edge detection filter to the image 206. For example, the drawing assistance system can apply an XDoG filter to the image 206 to produce the guidance map 208, 608.

FIG. 7 further illustrates that the method 700 includes an act 706 of geometrically correcting the stroke. More specifically, act 706 involves geometrically correcting the stroke 210 using the identified feature (i.e., guidance line 213) in the guidance map 208, 308, 608 of the image 206 as a guide. In other words, act 706 can involve generating a geometrically-corrected stroke 214. For example, act 706 can involve reducing or minimizing the differences in position and curvature of the stroke 210 from identified feature (i.e., guidance line 213). Act 706 can additionally involve determining a variation 210a, 210b of the stroke 210 from the identified feature (i.e., guidance line 213) of the guidance map 208, 308, 608. In order to maintain the user's style, act 706 can further involve at least partially maintaining the variation 210a, 210b when geometrically correcting the stroke 210. For instance, act 706 can involve reducing a difference between the variation 210a, 210b of the stroke 210 and a variation 214a, 214b of the geometrically-corrected stroke 214.

As illustrated by FIG. 7, the method 700 includes an act 708 of determining one or more deviations of the geometrically-corrected stroke from the identified feature of the guidance map. In other words, act 708 can involve determining an amount the geometrically-corrected stroke 214 differs from the identified feature (i.e., guidance line 213) of the guidance map 208, 608. For example, act 708 can involve determining differences in position and curvature between the geometrically-corrected stroke 214 and the identified feature (i.e., guidance line 213) in the guidance map 208, 608.

In addition to the foregoing, method 700 includes an act 710 of parametrically adjusting the geometrically-corrected stroke based on the determined deviations. More specifically, act 708 involves parametrically adjusting the geometrically-corrected stroke 214 by emphasizing or de-emphasizing the geometrically-corrected stroke 214 based on the deviations of the geometrically-corrected stroke 214 from the identified feature (i.e., guidance line 213) in the guidance map 208, 208, 608.

For example, act 710 can involve emphasizing portions 214c of the geometrically-corrected stroke 214 with deviations less than a pre-determined threshold to create emphasized portions 216c. Emphasizing portions of the geometrically-corrected stroke 214 involves increasing one or more of the width, opacity, or density of the portions 214c of the geometrically-corrected stroke 214 with deviations less than the pre-determined threshold.

Similarly, act 710 can involve de-emphasizing portions 214a, 214b, of the geometrically-corrected stroke 214 with deviations more than a pre-determined threshold to create de-emphasized portions 216a, 216b. De-emphasizing portions of the geometrically-corrected stroke 214 involves decreasing one or more of the width, opacity, or density of the portions 214a, 214b of the geometrically-corrected stroke 214 with deviations more than the pre-determined threshold.

Method 700 can involve rendering the parametrically adjusted, geometrically-corrected stroke. Method 700 can render the parametrically adjusted, geometrically-corrected stroke 216 as the user draws the stroke 210. In other words, the method 700 can render the parametrically adjusted and geometrically-corrected stroke 216 instead of, or in place of, the rendering the stroke 210. In such embodiments, the drawing assistance system will not render the stroke 210.

Referring now to FIG. 8, a flowchart of another exemplary method 800 of providing drawing assistance to a user sketching an image by geometrically correcting and parametrically adjusting user strokes is illustrated. As shown the method 800 includes an act 802 of identifying input points defining a stroke. In particular, act 802 involves identifying input points $x_i$ defining an input stroke 210 drawn by a user over an image 206. More specifically, act 802 can involve analyzing the stroke to identify points $x_i$ that define the stroke 210. Analyzing the stroke 210 can include sampling or resampling the stroke 210 to identify input stroke points $x_i$. Additionally, analyzing the stroke 210 can include determining a position and an orientation of each of the input points $x_i$.

Method 800 also includes an act 804 of identifying guidance points for the input points defining the stroke. More specifically, act 804 involves identifying guidance points $g_i$ from a guidance map 208, 308, 608 of the image 206 for the input points $x_i$ defining the input stroke 210. Act 804 can perform a nearest neighbor search to identify guidance points $g_i$ from the guidance map 208, 308, 608 nearest to the input points $x_i$ defining the stroke 210. The guidance points $g_i$ in turn can define a guidance line 213 of the guidance map 208 that corresponds to the stroke 210.

FIG. 8 further illustrates that method 800 includes an act 806 of determining geometrically-corrected points for the stroke based on the guidance points. In particular, act 806 can involve calculating a position and orientation for geometrically-corrected points $p_i$. Act 806 can involve reducing or minimizing a difference between the geometrically-corrected points $p_i$ and the guidance points $g_i$. Act 806 can further include determining a variation between neighboring input points $x_i$ and reducing a difference between the variation between the neighboring input points $x_i$ and a variation between neighboring geometrically-corrected points $p_i$ corresponding to the neighboring input points $x_i$. Thus, determining geometrically-corrected points $p_i$ can involve both aligning the geometrically-corrected points $p_i$ with the guidance points $g_i$ while maintaining variations in the stroke 210.

Method 800 additionally includes an act 808 of generating a geometrically-corrected stroke from the geometrically-corrected points. More specifically, act 808 involves generating a geometrically-corrected stroke 214 by fitting a line or curve to the geometrically-corrected points $p_i$. For example, act 808 can involve fitting the geometrically-corrected points $p_i$ with a cubic B-spline curve approximation or using a least squares regression technique or another line fitting algorithm.

As illustrated by FIG. 8, the method 800 further includes an act 810 of determining deviations of the geometrically-corrected points from the guidance points. Specifically, act 810 involves determining deviations for the geometrically-corrected points $p_i$ based on a difference in position and curvature between the geometrically-corrected points $p_i$ and the guidance points $g_i$. For example, act 810 can involve determining a difference in position and curvature between each geometrically-corrected points $p_i$ and its corresponding guidance point $g_i$.

The method also includes an act 812 of de-emphasizing a portion of the geometrically-corrected stroke corresponding to geometrically-corrected points with deviations greater than a pre-determined threshold. In other words, act 812 adjusts the portions 214a, 214b of the geometrically-corrected stroke 214 formed or defined by geometrically-corrected points $p_i$ with deviations greater than the pre-determined threshold. Act 812 involves modifying a visual property of the portion 214a, 214b of the geometrically-corrected stroke 214 to produce a parametrically-adjusted, geometrically-corrected stroke 216 with a de-emphasized portion 216a, 216b. For example, act 812 can involve decreasing one or more of the width, opacity, or density of the first portion 214a, 214b of the geometrically-corrected stroke 214.

Along related lines, the method 800 can further involve emphasizing a second portion 214c of the geometrically-corrected stroke 214 corresponding to geometrically-corrected points $p_i$ with deviations less than the pre-determined threshold. In particular, method 800 can involve modifying a visual property of the portion 216c of the geometrically-corrected stroke 214 to produce a parametrically-adjusted, geometrically-corrected stroke 216 with an emphasized portion 216c. For example, the method 800 can involve increasing one or more of the width, opacity, or density of the second portion 214c of the geometrically-corrected stroke 214.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the invention can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the invention. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
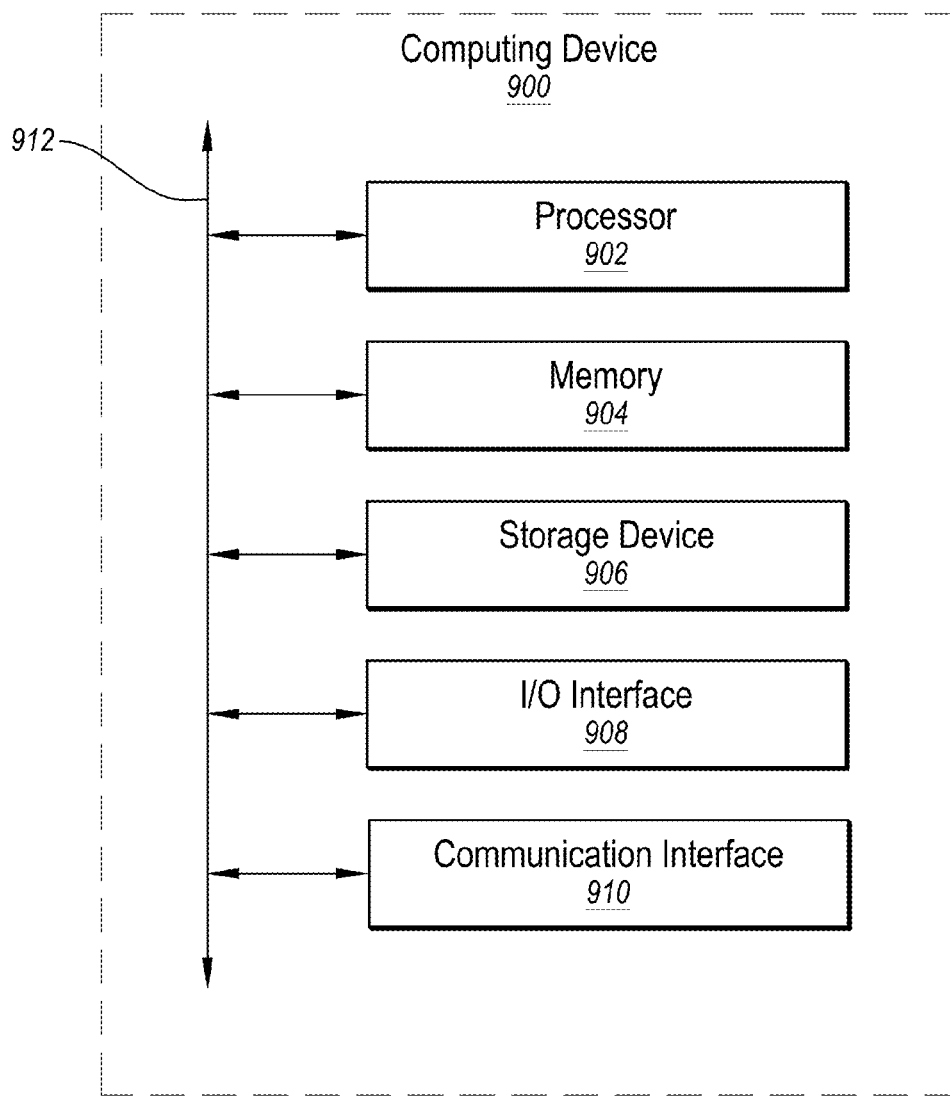
FIG. 9 illustrates a block diagram of an exemplary computing device in accordance with one or more embodiments of the present invention.

FIG. 9 illustrates, in block diagram form, an exemplary computing device 900 that may be configured to perform one or more of the processes described above. One will appreciate that the client device 118 (or even the server device 120) can comprise implementations of the computing device 900. As shown by FIG. 9, the computing device can comprise a processor 902, memory 904, a storage device 906, an I/O interface 908, and a communication interface 910. While an exemplary computing device 900 is shown in FIG. 9, the components illustrated in FIG. 9 are not intended to be limiting. Additional or alternative components may be used in other embodiments. Furthermore, in certain embodiments, a computing device 900 can include fewer components than those shown in FIG. 9. Components of computing device 900 shown in FIG. 9 will now be described in additional detail.

In particular embodiments, processor(s) 902 includes hardware for executing instructions, such as those making up a computer program. As an example and not by way of limitation, to execute instructions, processor(s) 902 may retrieve (or fetch) the instructions from an internal register, an internal cache, memory 904, or a storage device 906 and decode and execute them. In particular embodiments, processor(s) 902 may include one or more internal caches for data, instructions, or addresses. As an example and not by way of limitation, processor(s) 902 may include one or more instruction caches, one or more data caches, and one or more translation lookaside buffers (TLBs). Instructions in the instruction caches may be copies of instructions in memory 904 or storage 906.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 may be internal or distributed memory.

The computing device 900 includes a storage device 906 includes storage for storing data or instructions. As an example and not by way of limitation, storage device 906 can comprise a non-transitory storage medium described above. The storage device 906 may include a hard disk drive (HDD), a floppy disk drive, flash memory, an optical disc, a magneto-optical disc, magnetic tape, or a Universal Serial Bus (USB) drive or a combination of two or more of these. Storage device 906 may include removable or non-removable (or fixed) media, where appropriate. Storage device 906 may be internal or external to the computing device 900. In particular embodiments, storage device 906 is non-volatile, solid-state memory. In particular embodiments, Storage device 906 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 900 also includes one or more input or output ("I/O") devices/interfaces 908, which are provided to allow a user to provide input to (such as user strokes), receive output from, and otherwise transfer data to and from the computing device 900. These I/O devices/interfaces 908 may include a mouse, keypad or a keyboard, a touch screen, camera, optical scanner, network interface, modem, other known I/O devices or a combination of such I/O devices/interfaces 908. The touch screen may be activated with a stylus or a finger.

The I/O devices/interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 908 is configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 can provide one or more interfaces for communication (such as, for example, packet-based communication) between the computing device and one or more other computing devices 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI.

This disclosure contemplates any suitable network and any suitable communication interface 910. As an example and not by way of limitation, computing device 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computing system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 900 may include any suitable communication interface 910 for any of these networks, where appropriate.

The computing device 900 can further include a bus 912. The bus 912 can comprise hardware, software, or both that couples components of computing device 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A method of providing drawing assistance to a user sketching an image by geometrically correcting and parametrically adjusting user strokes comprising:

detecting a stroke drawn by a user on a touch screen of a client device;

comparing the stroke to a guidance map of the image to identify a feature in the guidance map to which the stroke corresponds;
geometrically correcting the stroke to create a geometrically-corrected stroke;
determining, by the client device, one or more deviations of the geometrically-corrected stroke from the identified feature in the guidance map;
parametrically adjusting the geometrically-corrected stroke by emphasizing or de-emphasizing the geometrically-corrected stroke based on the deviations of the geometrically-corrected stroke from the identified feature in the guidance map; and
rendering the parametrically adjusted, geometrically-corrected stroke on the touch screen of the client device in place of the stroke drawn by the user.

2. The method as recited in claim 1, wherein parametrically adjusting the geometrically-corrected stroke comprises emphasizing portions of the geometrically-corrected stroke with deviations less than a pre-determined threshold.

3. The method as recited in claim 2, wherein emphasizing the geometrically-corrected stroke comprising increasing one or more of the width, opacity, or density of the geometrically-corrected stroke.

4. The method as recited in claim 1, wherein parametrically adjusting the geometrically-corrected stroke comprises de-emphasizing portions of the geometrically-corrected stroke with deviations more than a pre-determined threshold.

5. The method as recited in claim 4, wherein de-emphasizing the geometrically-corrected stroke comprising decreasing one or more of the width, darkness, opacity, or density of the geometrically-corrected stroke.

6. The method as recited in claim 1, wherein determining, by the client device, the one or more deviations of the geometrically-corrected stroke from the identified feature in the guidance map comprises determining differences in position and curvature between the geometrically-corrected stroke and the identified feature in the guidance map.

7. The method as recited in claim 1, further comprising rendering the parametrically adjusted, geometrically-corrected stroke as the user draws the stroke.

8. The method as recited in claim 1, further comprising generating the guidance map by applying an edge detection filter to the image.

9. The method as recited in claim 8, wherein the edge detection filter comprises an extended Difference-of-Gaussians filter.

10. The method as recited in claim 8, wherein comparing the stroke to the guidance map of the image to identify the feature in the guidance map to which the stroke corresponds comprises determining an edge of the guidance map nearest to the stroke.

11. The method as recited in claim 1, further comprising:
determining a variation of the stroke from the feature of the guidance map; and
at least partially maintaining the variation when geometrically correcting the stroke.

12. A system comprising:
at least one hardware processor; and
at least one non-transitory computer readable storage medium storing instructions thereon that, when executed by the at least one hardware processor, cause the system to:
detect a stroke drawn by a user;
compare the stroke to a guidance map of the image to identify a feature in the guidance map to which the stroke corresponds;
geometrically correct the stroke to create a geometrically-corrected stroke;
determine deviations of the geometrically-corrected stroke from the identified feature in the guidance map;
parametrically adjust the geometrically-corrected stroke by emphasizing or de-emphasizing the geometrically-corrected stroke based on the deviations of the geometrically-corrected stroke from the identified feature in the guidance map; and
render the parametrically adjusted, geometrically-corrected stroke on a screen of the system in place of the stroke drawn by the user.

13. The system as recited in claim 12, wherein the instructions, when executed by the at least one hardware processor, cause the system to:
emphasize the geometrically-corrected stroke by increasing one or more of the width, opacity, darkness, or density of the geometrically-corrected stroke; and
de-emphasize the geometrically-corrected stroke by decreasing one or more of the width, opacity, darkness, or density of the geometrically-corrected stroke.

14. The system as recited in claim 13, wherein the instructions, when executed by the at least one hardware processor, further cause the system to determine the deviations of the geometrically-corrected stroke from the identified feature in the guidance map by determining differences in position and curvature between the geometrically-corrected stroke and the identified feature in the guidance map.

15. The system as recited in claim 14, wherein the instructions, when executed by the at least one hardware processor, further cause the system to:
determine a variation of the stroke from the feature of the guidance map; and
at least partially maintain the variation in the geometrically-corrected stroke.

16. The system as recited in claim 15, wherein the instructions, when executed by the at least one hardware processor, further cause the system to render the parametrically-adjusted, geometrically-corrected stroke in real-time as the user draws the stroke.

17. A method of providing drawing assistance to a user sketching an image by geometrically correcting and parametrically adjusting user strokes:
identifying input points defining an input stroke drawn by a user over an image provided on a screen of a client device;
identifying guidance points from a guidance map of the image for the input points defining the input stroke;
determining, by one or more hardware processors of the client device, geometrically-corrected points for the input points based on the guidance points;
generating a geometrically-corrected stroke by fitting a line to the geometrically-corrected points;
determining, by the one or more hardware processors, deviations for the geometrically-corrected points based on a difference in position and curvature between the geometrically-corrected points and the guidance points;
de-emphasizing a first portion of the geometrically-corrected stroke corresponding to geometrically-corrected points with deviations greater than a pre-determined threshold; and
rendering the de-emphasized and geometrically-corrected stroke on the screen of the client device in place of the stroke drawn by the user.

18. The method as recited in claim 17, further comprising emphasizing a second portion of the geometrically-corrected stroke corresponding to geometrically-corrected points with deviations less than the pre-determined threshold.

19. The method as recited in claim 18, further comprising:
emphasizing a second portion of the geometrically-corrected stroke by increasing one or more of the width, opacity, darkness, or density of the second portion of the geometrically-corrected stroke; and
wherein de-emphasizing the first portion of the geometrically-corrected stroke comprises decreasing one or more of the width, opacity, darkness, or density of the first portion of the geometrically-corrected stroke.

20. The method as recited in claim 17, wherein determining the geometrically-corrected points for the input points based on the guidance points comprises:
reducing a difference in distance and curvature between the geometrically-corrected points and the guidance points;
determining a variation between neighboring input points; and
reducing a difference between the variation between the neighboring input points and a variation between neighboring geometrically-corrected points corresponding to the neighboring input points.

\* \* \* \* \*